United States Patent
Lee et al.

(10) Patent No.: US 9,136,034 B2
(45) Date of Patent: Sep. 15, 2015

(54) POLYMER ELECTROLYTE MEMBRANE FOR A FUEL CELL, AND METHOD FOR PREPARING SAME

(75) Inventors: Moo-Seok Lee, Seoul (KR); Yong-Cheol Shin, Seoul (KR); Jae Hee Ryu, Seoul (KR); Na Young Kim, Chungcheongnam-do (KR); Kyoung-Ju Kim, Gyeonggi-do (KR); Chul Ki Kim, Jeollabuk-do (KR); Yong Hwan Lee, Gyeongsangbuk-do (KR); Yun Kyung Kang, Gyeongsangbuk-do (KR)

(73) Assignees: KOLON INDUSTRIES, INC., Kwacheon-si (KR); KOLON FAHION MATERIAL, INC., Kwacheon-si (KR)

(*) Notice: Subject to any disclaimer, the term of this patent is extended or adjusted under 35 U.S.C. 154(b) by 780 days.

(21) Appl. No.: 13/394,523

(22) PCT Filed: Aug. 25, 2010

(86) PCT No.: PCT/KR2010/005699
§ 371 (c)(1),
(2), (4) Date: Apr. 13, 2012

(87) PCT Pub. No.: WO2011/025259
PCT Pub. Date: Mar. 3, 2011

(65) Prior Publication Data
US 2012/0231355 A1      Sep. 13, 2012

(30) Foreign Application Priority Data

Aug. 25, 2009   (KR) .................. 10-2009-0078876
Apr. 28, 2010   (KR) .................. 10-2010-0039471

(51) Int. Cl.
*H01B 1/12*      (2006.01)
*C08J 5/22*      (2006.01)
(Continued)

(52) U.S. Cl.
CPC .............. *H01B 1/122* (2013.01); *C08J 5/2275* (2013.01); *H01M 8/0293* (2013.01);
(Continued)

(58) Field of Classification Search
CPC . H01M 8/0293; H01M 8/1027; H01M 8/103; H01M 8/106; H01M 8/1062
See application file for complete search history.

(56) References Cited

U.S. PATENT DOCUMENTS 5,858,264 A    1/1999   Ichino et al.
(Continued)

FOREIGN PATENT DOCUMENTS

JP      2001-158806 A       10/2007
KR   10-2007-0098157 A      10/2007

OTHER PUBLICATIONS

Cheng et al., "Preparation of Nonwoven Polyimide/Silica Hybrid Nanofiberous Fabrics by Combining Electrospinning and Controlled in Situ Sol—gel Techniques," 2009, European Polymer Journal, vol. 45, pp. 2767-2778.

*Primary Examiner* — Helen O Conley
(74) *Attorney, Agent, or Firm* — Sughrue Mion, PLLC

(57) ABSTRACT

The present disclosure relates to a polymer electrolyte membrane having a construction wherein an ionomer is charged in pores of a nanoweb having a high melting point, being insoluble in an organic solvent and having excellent pore characteristics, under optimum conditions. Therefore, an overall thickness of the electrolyte membrane may be reduced, thereby attaining advantages such as decrease in ohmic loss, reduction of material costs, excellent heat resistance, low thickness expansion rate which in turn prevents proton conductivity from being deteriorated over a long term. The polymer electrolyte membrane of the present invention comprises a porous nanoweb having a melting point of 300☐ or more and being insoluble in an organic solvent of NMP, DMF, DMA, or DMSO at room temperature; and an ionomer which is charged in pores of the porous nanoweb and contains a hydrocarbon material soluble in the organic solvent at room temperature.

4 Claims, 1 Drawing Sheet

(51) Int. Cl.
 *H01M 8/02* (2006.01)
 *H01M 8/10* (2006.01)

(52) U.S. Cl.
 CPC ............ *H01M 8/103* (2013.01); *H01M 8/106* (2013.01); *H01M 8/1027* (2013.01); *H01M 8/1032* (2013.01); *H01M 8/1062* (2013.01); *C08J 2339/06* (2013.01); *C08J 2381/02* (2013.01); *H01M 2300/0088* (2013.01); *Y02E 60/521* (2013.01)

(56) References Cited

U.S. PATENT DOCUMENTS

| | | |
|---|---|---|
| 6,248,469 B1 | 6/2001 | Formato et al. |
| 6,523,699 B1 | 2/2003 | Akita et al. |
| 2009/0209668 A1 | 8/2009 | Lee et al. |

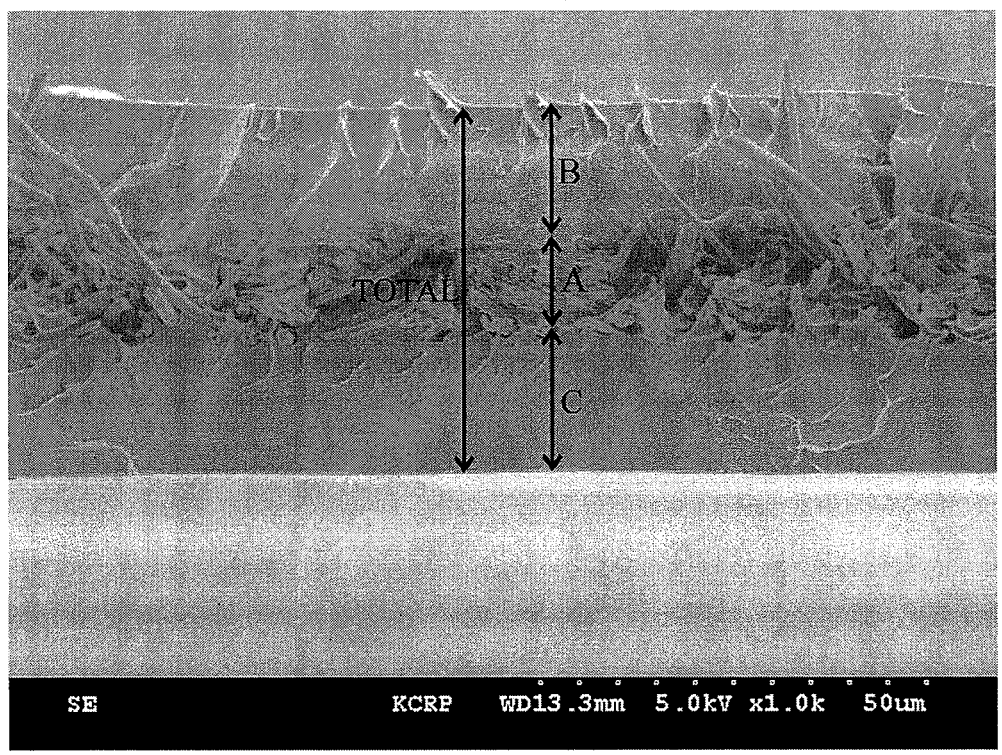

POLYMER ELECTROLYTE MEMBRANE FOR A FUEL CELL, AND METHOD FOR PREPARING SAME

TECHNICAL FIELD

The present invention relates to an electrolyte membrane for a fuel cell and, more particularly, to a polymer electrolyte membrane.

BACKGROUND ART

A fuel cell refers to a battery directly changing chemical energy generated by oxidation of a fuel into electric energy (that is, electricity) and has high energy efficiency and eco-friendly features such as reduced discharge of contaminants, thereby becoming popular as a next-generation energy source.

The fuel cell generally has a structure comprised of an oxidation electrode (anode) and a reduction electrode (cathode) by interposing an electrolyte membrane, and such a structure is referred to as a membrane electrode assembly (MEA).

The fuel cell may include an alkali electrolyte membrane fuel cell, a polymer electrolyte membrane fuel cell (PEMFC), etc., in terms of types of electrolytes, and among these, the polymer electrolyte membrane fuel cell shows advantageous features such as low operational temperature of less than 100° C., rapid start and response characteristics, excellent durability, etc. and is thus receiving considerable attention as a power device for portable use, automobiles and/or household appliances.

As a representative example of such a polymer electrolyte fuel cell, there is a proton exchange membrane fuel cell (PEMFC) using hydrogen gas as a fuel.

A reaction occurring in the PEMFC may be briefly described as follow. First, since a fuel such as hydrogen gas is supplied to an oxidation electrode (hereinafter, anode'), protons ($H^+$) and electrons ($e^-$) are generated on the anode by oxidation of hydrogen. The generated protons ($H^+$) are delivered to a reduction electrode (hereinafter, 'cathode') through a polymer electrolyte membrane, while the generated electrons ($e^-$) migrate to the cathode via an external circuit. The cathode may be provided with oxygen and the oxygen may be combined with protons ($H^+$) and electrons ($e^-$) to produce water by reduction of the oxygen.

The polymer electrolyte membrane is a passage through which the proton ($H^+$) is transferred to the cathode, which therefore, must have a high proton ($H^+$) conductivity. In addition, the polymer electrolyte membrane should have excellent separation ability that separates hydrogen gas supplied to the anode and oxygen fed to the cathode, respectively. Moreover, the polymer electrolyte membrane needs superior mechanical strength, dimensional stability, chemical resistance, etc. while having reduced ohmic loss at a high current density, in addition to the foregoing characteristics.

The polymer electrolyte membrane currently used in the art may include, for example, a fluorine resin such as perfluorosulfonic acid resin (hereinafter, referred to as a 'fluorine ionomer'). However, the fluorine ionomer has a low mechanical strength and, when used for a long period of time, pinholes may be generated which in turn causes deterioration in energy conversion efficiency. Although increasing a membrane thickness of the fluorine ionomer has been attempted to reinforce mechanical strength, this increases not only ohmic loss but also consumption of an expensive raw material, thus being less economical.

In order to solve the foregoing problems, a polymer electrolyte membrane having improved mechanical strength prepared by impregnating a porous polytetrafluoroethylene resin (trade name: Teflon) as a fluorine resin (hereinafter, referred to as a 'Teflon resin') with a fluorine ionomer in a liquid status has been proposed.

In this case, compared to a polymer electrolyte film comprised of a fluorine ionomer alone, the above prepared membrane has relatively high mechanical strength, thus decreasing a thickness of the electrolyte membrane and finally attaining advantages such as a decrease in ohmic loss, even though proton conductivity may be slightly reduced.

However, since the Teflon resin has very low adhesiveness, selection of ionomers is restricted. In addition, a fluorine ionomer-applied product entails a disadvantage of high crossover (phenomenon), compared to hydrocarbon based products. Further, since the porous Teflon resin as well as the fluorine ionomer are expensive, development of cheap and novel materials for mass-production is still required.

DISCLOSURE

Technical Problem

In order to overcome conventional problems described above, the present invention is directed to provision of a polymer electrolyte membrane having a construction wherein an ionomer is charged in a nanoweb having a high melting point, being insoluble in an organic solvent and having excellent pore properties under optimum conditions, so as to reduce an overall thickness which in turn reduces ohmic loss while decreasing material costs, and exhibiting excellent heat resistance and low thickness expansion rate. Consequently, the foregoing polymer electrolyte membrane may retain desired proton conductivity for a long time.

Technical Solution

According to one aspect of the present invention to solve the foregoing problems, there is provided a polymer electrolyte membrane, including: a porous nanoweb which has a melting point of 300° C. or more and is insoluble in an organic solvent at room temperature, such as NMP, DMF, DMA or DMSO; and an ionomer which is charged in pores of the porous nanoweb and contains a hydrocarbon material soluble in the above organic solvent.

The polymer electrolyte membrane may have a thickness expansion rate of 10% or less.

The polymer electrolyte membrane may have a thickness ratio of the nanoweb of 20% or more, which is measured according to the following equation:

$$\text{Thickness ratio of nanoweb}=[A/(B+C)]\times 100$$

wherein A is the average thickness of a nanoweb, B is the average thickness of a top ionomer and C is the average thickness of a bottom ionomer.

The nanoweb may include polyimide, polybenzoxazole, or a copolymer or mixture thereof.

The nanoweb may comprise nano-fibers having an average diameter of 0.005 to 5 μm.

The nanoweb may have an average thickness of 1 to 20 μm. The nanoweb may have porosity of 50 to 98% and an average pore diameter ranging from 0.05 to 30 μm.

The ionomer may include, for example; sulfonated polyimide (S-PI), sulfonated polyarylethersulfone (S-PAES), sulfonated polyetheretherketone (S-PEEK), sulfonated polybenzimidazole (S-PBI), sulfonated polysulphone (S-PSU), sulfonate polystyrene (S-PS), sulfonated polyphosphazene; or mixtures thereof, and so forth.

The polymer electrolyte membrane may have a mechanical strength of 10 MPa or more.

According to another aspect of the present invention to solve the foregoing problems, there is provided a method for preparing a polymer electrolyte membrane, which includes: preparing a spin solution by dissolving a precursor in a spinning solvent; electro-spinning the spin solution to prepare a porous nanoweb comprised of nano-fibers having an average diameter of 0.005 to 5 μm; post-treating the porous nanoweb to allow the porous nanoweb to be insoluble in any organic solvent such as NMP, DMF, DMA or DMSO; dissolving an ionomer containing a hydrocarbon material soluble in the above organic solvent, in the same organic solvent, to prepare an ionomer solution; and filling pores of the post-treated porous nanoweb with the ionomer solution, so as to have a thickness ratio of the nanoweb of 20% or more measured by the following equation, and then, removing the organic solvent:

$$\text{Thickness ratio of nanoweb} = [A/(B+C)] \times 100$$

wherein A is the average thickness of a nanoweb, B is the average thickness of a top ionomer and C is the average thickness of a bottom ionomer.

The precursor may have a water content of 0.5% or less. The post-treatment may include thermal treatment or a chemical process.

The porous nanoweb may include polyimide or polybenzoxazole.

Advantageous Effects

The present invention attains the following effects:

First, the polymer electrolyte membrane according to the present invention has a structure of ionomers charged in pores of the nanoweb, which has excellent thermal resistance and is insoluble in an organic solvent, under optimum conditions. Therefore, an overall thickness of the electrolyte membrane may be reduced, thus improving proton conductivity while reducing ohmic loss and reducing thickness expansion rate. Consequently, performance of the foregoing membrane may be successfully retained for a long period of time.

Second, the polymer electrolyte membrane of the present invention may include a nanoweb and an ionomer, both of which comprise hydrocarbon polymer materials to improve adhesion therebetween, thereby attaining excellent durability.

Third, the polymer electrolyte membrane of the present invention is prepared using hydrocarbon polymer materials at relatively low cost, without using conventional fluorine-based ionomers or Teflon resin. Consequently, the present invention is economical preferably in terms of cost and mass production.

DESCRIPTION OF DRAWINGS

The accompanying drawing is given to aid in understanding of the present invention and constructing a part of the detailed description, is an illustrative embodiment of the present invention and explains principles of the present invention, in which:

FIG. 1 is a cross-sectional view illustrating a polymer electrolyte membrane according to one embodiment of the present invention.

BEST MODE

It would be obvious to those skilled in the art that various modifications and variations are possible within the technical spirit and scope of the present invention. Therefore, the present invention includes such modifications and variations in the range of inventions stipulated in the claims and equivalents thereof Hereinafter, the present invention will be described in more detail.

The polymer electrolyte membrane according to the present invention may include a porous nanoweb, and an ionomer charged in pores of the porous nanoweb.

The porous nanoweb of the present invention may improve mechanical strength of the polymer electrolyte membrane and inhibit volume expansion caused by moisture, thus enhancing morphologic stability. In addition, the porous nanoweb may comprise hydrocarbon polymers having economical advantages in terms of cost.

Specially, since the porous nanoweb is insoluble in the organic solvent such as NMP, DMF, DMA or DMSO at room temperature, a process of filling the nanoweb pores with the ionomer may be easily conducted. That is, in order to charge the ionomer in the nanoweb pores, the ionomer is firstly dissolved in an organic solvent to prepare an ionomer solution and this solution is charged in the pores of the porous nanoweb. In this regard, when the porous nanoweb is dissolved in the organic solvent, the nanoweb is dissolved during filling of the pores of the nanoweb with the ionomer, in turn causing a problem in producing a polymer electrolyte membrane having a desired structure. Accordingly, the porous nanoweb may comprise a hydrocarbon material insoluble in the organic solvent.

The porous nanoweb preferably includes a hydrocarbon material having a melting point of 300° C. or more. As such, the porous nanoweb has a high melting point and, therefore, can maintain a stable form while being less isolated from an electrode even in a high temperature environment, thereby advantageously retaining performance thereof for a long term.

Porous nanowebs satisfying requirements described in the foregoing may include, for example; polyimide, polybenzoxazole, or a copolymer or mixture thereof.

The porous nanoweb is substantially comprised of a web form wherein desired fibers are thee-dimensionally connected and, here, a thickness of the fiber may range from 0.005 to 5 μm. If the thickness of the fiber forming the nanoweb is less than 0.005 μm, the mechanical strength of the porous nanoweb may be decreased. On the contrary, when the thickness of the fiber exceeds 5 μm, porosity of the porous nanoweb may not be easily controlled.

The porous nanoweb may be formed to a thickness of 5 to 20 μm. If the thickness of the porous nanoweb is less than 5 μm, mechanical strength and morphological stability of the polymer electrolyte membrane may be deteriorated. On the other hand, when the thickness of the porous nanoweb exceeds 20 μm, the polymer electrolyte membrane may have increased ohmic loss.

The porous nanoweb may have a porosity of 70 to 98%. If the porosity of the porous nanoweb is less than 70%, proton conductivity of the polymer electrolyte membrane may be reduced. On the contrary, when the porosity of the porous nanoweb exceeds 98%, mechanical strength and morphological stability may be deteriorated.

The ionomer may conduct ionic conduction as a major function of the polymer electrolyte membrane, wherein hydrocarbon polymers having excellent proton conductivity and economical advantages may be used as the ionomer. As described above, in order to easily fill the pores of the porous nanoweb with the ionomer, hydrocarbon materials soluble in an organic solvent may be included. Such hydrocarbon polymer satisfying the foregoing requirements and useable for the ionomer may include, for example; sulfonate polyimide (S-PI), sulfonated polyarylethersulfone (S-PAES), sulfonated polyetheretherketone (S-PEEK), sulfonated polybenzimidazole (S-PBI), sulfonated polysulfone (S-PSU), sulfonated polystyrene (S-PS), sulfonated polyphosphazene, or mixtures thereof, without being particularly limited thereto. Here, the term 'soluble' in an organic solvent means a characteristic of being dissolved in some organic solvents such as NMP, DMF, DMA or DMSO at room temperature.

The ionomer may be charged in pores of the porous nanoweb. In the case where operational conditions such as temperature, humidity, etc., are altered during operation of a fuel cell, adhesion between the ionomer and the porous nanoweb may be decreased. According to the present invention, since both the ionomer and the porous nanoweb comprise hydrocarbon polymers, such adhesion therebetween is substantially excellent. Moreover, a hydrocarbon material contained in the ionomer and another hydrocarbon material contained in the porous nanoweb may be substantially identical to each other. More particularly, if S-PI is used as the ionomer while the porous nanoweb comprises polyimide, adhesion between the ionomer and the porous nanoweb may be greatly enhanced.

As such, since the adhesion between the porous nanoweb and the ionomer is excellent, an electrolyte membrane comprising the foregoing materials may inhibit three-dimensional expansion caused by moisture, thus relatively decreasing length and thickness expansion rates.

As described above, a polymer electrolyte membrane which includes the porous nanoweb having excellent pore characteristics and an ionomer sufficiently charged in pores of the porous nanoweb, may have a thickness expansion rate of 10% or less. That is, the thickness expansion rate, which is a degree of deformation in a thickness direction relative to water content of the polymer electrolyte membrane, is preferably not more than 10%. The polymer electrolyte membrane used for a fuel cell is repeatedly expanded and contracted when being exposed to high humidity. Thus, if a thickness expansion rate thereof is too high, it may be separated from the electrode. If the electrode and the separator are separated from each other, performance of the fuel cell may be significantly deteriorated.

The thickness expansion rate of the polymer electrolyte membrane may be calculated by the following equation:

$$\text{Thickness expansion rate}(\%) = [(T1 - T0)/T0] \times 100$$

wherein $T0$ is the average thickness of a polymer electrolyte membrane before expansion thereof in water, and $T1$ is the average thickness of a polymer electrolyte membrane after expansion thereof in water.

Such a thickness expansion rate is greatly influenced not only by constitutional materials of an electrolyte membrane but also by a structure of the same. For instance, if the electrolyte membrane is a single film comprised of an ionomer, it may have very high water content based on characteristics of the ionomer. Owing to such characteristics, the single film is directly influenced by such water content, in turn considerably increasing the thickness expansion rate.

Also, an electrolyte membrane formed by filling a web with the ionomer, wherein a plurality of fibers are three-dimensionally entangled to form the web, may three-dimensionally inhibit expansion by moisture, thus relatively decreasing a length and a thickness expansion rate. Specially, when the web functioning as a support is strongly adhered to the ionomer, the thickness expansion rate of the electrolyte membrane is further decreased. The reason for this is to be considered that a web functioning as a support is generally hydrophobic and less expanded by moisture and an ionomer strongly adhered to such a web is influenced by moisture expansible properties of the web, thereby further reducing the thickness expansion rate.

In addition, if the web is comprised of fibers having a small diameter, surface area and porosity of the web are increased and an optimum and three-dimensional structure may be formed, therefore, an electrolyte membrane fabricated using the foregoing material may have very low thickness expansion rate.

The polymer electrolyte membrane according to the present invention is substantially fabricated using a nanoweb, which is formed by entangling nano-fibers under optimum conditions and has excellent porosity as well as favorable surface area. Since the inventive membrane comprises the nanoweb described above, as well as an ionomer strongly adhered to the nanoweb, the membrane may have a low thickness expansion rate of not more than 10%.

With regard to the polymer electrolyte membrane, a thickness ratio of the nanoweb measured according to the following equation may be 20% or more:

$$\text{Thickness ratio of nanoweb} = [A/(B+C)] \times 100$$

wherein A is the average thickness of a nanoweb, B is the average thickness of a top ionomer, and C is the average thickness of a bottom ionomer.

If the thickness ratio of the nanoweb is less than 20%, a support part of the electrolyte membrane is too decreased, in turn greatly deteriorating mechanical properties of the membrane. Therefore, durability may be considerably decreased while increasing a thickness expansion rate, which in turn, deteriorates (fuel) cell performance.

Since the polymer electrolyte membrane of the present invention has a construction of filling pores of the porous nanoweb with an ionomer, mechanical strength thereof may be improved to 10 MPa or more. In addition, such improved mechanical strength may decrease an overall thickness of the polymer electrolyte membrane to 80 μm or less, thus accelerating ionic conduction (that is, increasing an ionic conduction rate) while reducing ohmic loss and decreasing the material costs.

The present invention employs a porous nanoweb and an ionomer, which are used to fabricate a polymer electrolyte membrane, wherein the above two components comprise hydrocarbon based polymer materials to exhibit excellent adhesiveness, thus attaining excellent durability. Moreover, without using a high cost fluorine ionomer or Teflon resin conventionally used in the art, relatively low price hydrocarbon polymer materials are used, thus achieving an advantage such as economical benefits in mass-production.

The following description will be given of explaining a method for preparing a polymer electrolyte membrane according to one embodiment of the present invention. For some items substantially the same as described above, such as types (or species) of polymers, weight ratio, etc., detailed description will be omitted.

First, a method for preparing a polymer electrolyte membrane may include:

preparation of a porous nanoweb containing a hydrocarbon material insoluble in an organic solvent; and preparation of an ionomer solution by dissolving an ionomer containing a hydrocarbon material, which is soluble in the organic solvent, in the organic solvent.

With regard to the preparation of the nanoweb and the preparation of the ionomer solution, the order of processing operations is not particularly defined.

Since the porous nanoweb includes a hydrocarbon material insoluble in an organic solvent, a nanoweb is formed using a precursor soluble in the organic solvent, followed by a desired reaction to produce a porous nanoweb.

More particularly, a precursor is dissolved in a spin solvent to prepare a spin solution and the prepared spin solution is electrically spun to form a porous nanoweb comprised of nano-fibers having an average diameter of 0.005 to 5 μm, followed by post-treatment of the nanoweb, resulting in a desired porous nanoweb as a final product.

The porous nanoweb may be fabricated through electrical spinning to have high porosity, microfine pores and a thin film (that is, reduced thickness).

Meanwhile, the porous nanoweb insoluble in an organic solvent cannot be directly prepared by electrical spinning. That is, it is difficult to prepare a spin solution since polyimide or polybenzoxazole used for the porous nanoweb is not likely to be dissolved in a solvent such as NMP, DMF, DMA or DMSO.

First, a precursor nanoweb is formed using a precursor well soluble in an organic solvent. Then, the formed precursor nanoweb is post-treated to prevent it from being dissolved in the organic solvent described above, thus obtaining a porous nanoweb insoluble in the organic solvent.

The precursor may have a water content of 0.5% or less. The reason for this is to be considered that, if the water content of the precursor exceeds 0.5%, viscosity of a spin solution is reduced by moisture and, after spinning, a filament may be cut by moisture, thus deteriorating processing properties. The foregoing may become a defect of deteriorating physical properties (of the nanoweb).

Post-treatment of the precursor nanoweb to form an insoluble porous nanoweb may include thermal treatment or chemical treatment. Specifically, the thermal treatment may be conducted using a hot press, which is set to a high temperature and a high pressure.

Hereinafter, a method for preparing a polyimide porous nanoweb according to one embodiment of the present invention will be described in detail.

After preparing a nanoweb precursor by electrically spinning a polyamic acid precursor, the nanoweb precursor may be subjected to imidization using a hot press, to form a polyimide porous nanoweb.

More particularly, polyamic acid is dissolved in tetrahydrofurane (THF) to prepare a precursor solution, the prepared precursor solution is discharged through a spin nozzle at a temperature of 20 to 100° C. while applying high voltage of 1 to 1,000 kV thereto, to form a polyamic acid nanoweb on a collector. Afterwards, the formed polyamic acid nanoweb is heated in a hot press preset to 80 to 400° C., resulting in a polyimide porous nanoweb.

A polybenzoxazole porous nanoweb according to another embodiment of the present invention may be fanned using a polyhydroxyamide precursor by a method similar to the foregoing process, including electrical spinning and thermal treatment.

As such, the polyimide or polybenzoxazole porous nanoweb insoluble in an organic solvent while having a high melting point, may function to improve heat resistance, chemical resistance and/or mechanical properties of an electrolyte membrane.

Next, the ionomer solution may be charged in pores of the porous nanoweb described above.

A process of filling the pores of the porous nanoweb with the ionomer solution may include immersion, without being particularly limited to the above. Instead, various other methods such as laminating, spraying, screen printing, doctor blade, and so forth, which are well known in the related art, may be employed.

The immersion may be performed by repeatedly immersing 2 to 5 times at room temperature for 5 to 30 minutes.

After charging the ionomer solution, the organic solvent portion in the ionomer is removed, thus enabling the ionomer to be charged in the pores of the porous nanoweb. The removal of the organic solvent may be conducted by drying the nanoweb in an oven at 60 to 150° C. for 2 to 5 hours.

EXAMPLE 1

A polyamic acid/THF spin solution having a concentration of 12 wt. % was electrically spun under application of 30 kV, and then, thermally treated (that is, heated) in an oven at 350° C. for 5 hours, to form a polyimide porous nanoweb having an average thickness of 15 μm. In this regard, the electrical spinning was conducted at 25° C. using a spray jet nozzle while applying voltage of 30 kV.

Sufonated polyetheretherketone (S-PEEK) was dissolved in N-methyl-2-pyrrolidone (NMP) to prepare a 10 wt. % ionomer solution.

The porous nanoweb was impregnated with the ionomer solution. More particularly, an immersion for 20 minutes was conducted three times at room temperature. In order to remove microfine bubbles, a reduced atmosphere was applied for about 1 hour. After every each immersion, drying was conducted in a hot blow oven maintained at 80° C. for 3 hours to remove NMP, and a polymer electrolyte membrane having an average thickness of 45 μm was finally obtained.

EXAMPLE 2

A polymer electrolyte membrane was produced by the same procedure as described in Example 1, except that the average diameter of the porous nanoweb was changed to 10 μm by controlling electrical spinning conditions and the average thickness of an electrolyte film was changed to 50 μm by adjusting an immersed amount of the ionomer.

COMPARATIVE EXAMPLE 1

Sufonated polyetheretherketone (S-PEEK) was dissolved in N-methyl-2-pyrrolidone (NMP) to prepare a 15 wt. % ionomer solution. Using a doctor blade, a film was formed on a glass sheet, followed by drying the same in a hot blow oven maintained at 80° C. to remove NMP, resulting in a single-film type polymer electrolyte membrane having a thickness of 50 μm.

COMPARATIVE EXAMPLE 2

After mixing and dissolving 25 wt. % of polysulfone and 5 wt. % of PVP in a DMAc solution, a film was formed on a glass sheet using a doctor blade and then immersed in water at room temperature. Next, the resulting product was immersed in ultra-pure water overnight to remove solvent residue, followed by drying the same in a hot blow oven maintained at 80° C. for 24 hours to remove NMP, resulting in a polysulfone porous film having a thickness of 30 μm. A nafion solution dispersed in alcohol was impregnated into the polysulfone porous film and dried according to the same procedures as described in Example 1, resulting in a polymer electrolyte membrane having an average thickness of 45 μm.

COMPARATIVE EXAMPLE 3

A polymer electrolyte membrane was produced by the same procedure as described in Example 1, except that the average diameter of the porous nanoweb was changed to 8 μm by controlling electrical spinning conditions and the average thickness of an electrolyte film was changed to 50 μm by adjusting an immersed amount of the ionomer.

For the porous nanowebs and the porous polymer electrolyte membranes prepared in the foregoing examples and comparative examples, physical properties thereof were measured according to the following methods, which are shown in Table 1.

Thickness (μm) of Each Porous Nanoweb and Polymer Electrolyte Membrane

For each of the porous nanoweb and the polymer electrolyte membrane, 10 sample points were selected and thicknesses thereof were measured using a micrometer. Based on the average of the measured values, the thicknesses of the porous nanoweb and the polymer electrolyte membrane, respectively, were assessed.

Thickness Ratio of Nanoweb (%)

As shown in FIG. 1, from the average thickness (A) of the nanoweb and the average thickness (B+C) of the ionomer by a cross-sectional image of the polymer electrolyte membrane obtained using an electron microscope, a thickness ratio of the nanoweb according to the following equation:

Thickness ratio of nanoweb(%)=[$A/(B+C)$]×100

Mechanical Strength (MPa) of Polymer Electrolyte Membrane

According to ASTM 638, a mechanical strength (MPa) of the polymer electrolyte membrane was measured. Detailed measurement conditions are as follows:

Tensile speed: 25 cm/min

Grip interval: 6.35 cm

Temperature and humidity: 25□×50%

Thickness Expansion Rate (%) of Polymer Electrolyte Membrane

From each of the polymer electrolyte membranes prepared in the above examples and comparative examples, a sample having dimensions of 10 cm×10 cm was prepared and the sample was subjected to vacuum drying at 80□ for 3 hours and measuring a thickness (TO) thereof Following this, the sample was immersed in water at room temperature for 3 hours and then taken out. After removing water from the surface of the sample, a thickness (T1) of the sample was measured. Next, the sample thicknesses before and after expansion (swelling) were used to calculate a thickness expansion rate (%) of the polymer electrolyte membrane by the following equation.

Thickness expansion rate (%)=[($T1-T0$)/$T0$]×100

TABLE 1

| | Thickness ratio (%) | Mechanical strength (MPa) | Thickness expansion rate (%) |
|---|---|---|---|
| Example 1 | 50 | 25 | 5 |
| Example 2 | 25 | 18 | 9 |
| Comparative Example 1 | 0 | 8 | 37 |
| Comparative Example 2 | 50 | 20 | 11 |
| Comparative Example 3 | 19 | 12 | 13 |

INDUSTRIAL APPLICABILITY

The electrolyte membrane of the present invention may have excellent durability and proton conductivity and low thickness expansion rate, thereby being widely used in a variety of applications such as a separator of a fuel cell.

The invention claimed is:

1. A method for preparing a polymer electrolyte membrane, comprising:
    dissolving a precursor in a spin solvent to prepare a spin solution;
    electrically spinning the spin solution to prepare a porous nanoweb comprised of nano-fibers having an average diameter of 0.005 to 5 μm;
    post-treating the porous nanoweb to allow the porous nanoweb to be insoluble in an organic solvent selected from the group consisting of N-methylpyrrolidone, dimethylformamide, dimethylacetamide, and dimethyl sulfoxide;
    dissolving an ionomer containing a hydrocarbon material in the organic solvent to obtain an ionomer solution, the hydrocarbon material being soluble in the organic solvent; and
    filling pores of the post-treated porous nanoweb with the ionomer solution such that a thickness ratio of the nanoweb measured by the following equation becomes 20% or more, followed by removing the organic solvent:

Thickness ratio of nanoweb=[$A/(B+C)$]×100 wherein A is an average thickness of a nanoweb, B is an average thickness of a top ionomer, and C is an average thickness of a bottom ionomer.

2. The method according to claim 1, wherein the precursor has a water content of 0.5 wt. % or less.

3. The method according to claim 1, wherein the post-treatment includes thermal treatment or chemical treatment.

4. The method according to claim 1, wherein the porous nanoweb includes polyimide or polybenzoxazole.

* * * * *